US008856537B2

(12) United States Patent
El-Abed et al.

(10) Patent No.: US 8,856,537 B2
(45) Date of Patent: Oct. 7, 2014

(54) METHOD FOR PROTECTING A TELECOMMUNICATION NETWORK AND SECURE ROUTER IMPLEMENTING SUCH A METHOD

(75) Inventors: Haithem El-Abed, Nozay (FR); Antony Martin, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 297 days.

(21) Appl. No.: 13/375,127

(22) PCT Filed: Apr. 22, 2010

(86) PCT No.: PCT/FR2010/050770
§ 371 (c)(1),
(2), (4) Date: Jan. 3, 2012

(87) PCT Pub. No.: WO2010/139871
PCT Pub. Date: Dec. 9, 2010

(65) Prior Publication Data
US 2012/0102330 A1   Apr. 26, 2012

(30) Foreign Application Priority Data

Jun. 2, 2009 (FR) ...................................... 09 53639

(51) Int. Cl.
*H04L 9/32* (2006.01)
*H04L 12/755* (2013.01)
*H04L 12/751* (2013.01)

(52) U.S. Cl.
CPC .............. *H04L 45/021* (2013.01); *H04L 45/02* (2013.01); *H04L 45/025* (2013.01)
USPC ......................................................... 713/176

(58) Field of Classification Search
USPC ......................................................... 713/176
See application file for complete search history.

(56) References Cited

U.S. PATENT DOCUMENTS 6,973,023 B1   12/2005  Saleh et al.

7,529,480 B2 *   5/2009  Seddigh et al. ................. 398/14
(Continued)

FOREIGN PATENT DOCUMENTS

EP            1056010         11/2000

OTHER PUBLICATIONS

Jou Y.F. et al; Design and Implementation of a Scalable Intrusion Detection System for the Protection of Network Infrastructure; Darpa Information Survivability Conference and Exposition; 2000; Disce X '00; Proceedings Hilton Head, SC, USA, Jan. 25-27, 2000; Las Alamitos, CA; USA; IEEE Comput. Soc. US; vol. 2, Jan. 25, 2005; pp. 69-83; XP010371109.

*Primary Examiner* — Amare F Tabor
(74) *Attorney, Agent, or Firm* — Carmen Patti Law Group, LLC

(57) ABSTRACT

This invention pertains to a method for protecting a telecommunication network comprising at least one secure router (100) equipped with a topology map (103) of that network in order to determine the intermediate routers which constitute an optimal pathway for routing information, said secure router and said intermediate routers generating this topological map by sharing the lists of links (LSA1, LSA2, LSAn) using a communications protocol, characterized in that the secure router (100) performs the following steps:

The step (109) of calculating and then saving, when a list of links (LSA1, LSA2, . . . LSAn) is received, at least one receiving fingerprint (hash(LSA1), hash(LSA2), . . . hash(LSAn)) of the lists received (LSA1, LSA2, . . . LSAn), The step (120) of calculating and then saving, when a list of links (LSA'1, LSA'2, . . . LSA'n) is transmitted, at least one sending fingerprint (hash(LSA'1), hash(LSA'2), . . . hash(LSA'n)) of the lists to be transmitted, and The step of comparing the receiving fingerprint (hash (LSA1), hash(LSA2), . . . hash(LSAn)) to the sending fingerprint (hash(LSA'1), hash(LSA'2), . . . hash(LSA'n) such that the sending of a list of links (LSA1, LSA2, LSAn) is inhibited if the receiving fingerprint is different from the sending fingerprint.

13 Claims, 3 Drawing Sheets

(56) References Cited

U.S. PATENT DOCUMENTS

| | | | |
|---|---|---|---|
| 7,624,095 B2 * | 11/2009 | Majumder | 705/7.29 |
| 7,765,599 B2 * | 7/2010 | Casas et al. | 726/26 |
| 7,808,927 B2 * | 10/2010 | Retana et al. | 370/254 |
| 7,904,727 B2 * | 3/2011 | Bleckmann et al. | 713/176 |
| 8,259,585 B1 * | 9/2012 | S P et al. | 370/237 |
| 2006/0010249 A1 | 1/2006 | Sabesan et al. | |
| 2007/0127457 A1 | 6/2007 | Mirtorabi et al. | |

* cited by examiner

METHOD FOR PROTECTING A TELECOMMUNICATION NETWORK AND SECURE ROUTER IMPLEMENTING SUCH A METHOD

TECHNICAL FIELD

The present invention pertains to a method for protecting a telecommunication network, as well as a router implementing such a method.

BACKGROUND

A telecommunication network such as the Internet comprises a plurality of intermediary routers connected to one another in such a way that information transmitted from a first server to a second server is generally routed by one or more of these intermediary routers.

In order to optimize these intermediary transmissions, it is known to equip each router with a map identifying the topology of its network, or more generally speaking, of a part of that network—hereafter known as an area—in which it is located.

Such a topological map presents a state of relationships between the routers of its network or area such that, considering a first router and a second router located on that map, the first router may determine, with the help of that topological map, an optimal path, meaning a list of intermediary routers, to transmit information to that second router through that network or area.

In concrete terms, and within the context of the Internet, it is known to use a routing protocol known as OSPF, for "Open Shortest Path First", according to which each router i of an area particularly determines a list of links LSAi, for "Link-State Advertisements", identifying routers in that area to which it is directly connected, hereafter known as neighboring routers.

Afterward, each router i shares with its neighboring routers, in a message known as LSU for "Link-State Update" its list of links LSAi and lists of links LSA1, LSA2, . . . LSAn received from other routers.

Each router may then store, in a database known as LSDB for "Link-State Database", these lists of links, such that, based on this LSDB database, a router comprised within this OSPF area determines an optimal path—typically the shortest one using the "Shortest Path First" approach—to transmit information to another router comprised within the same OSPF area.

In order to prevent a fraudulent hijacking of information transmitted via the Internet, it is conceivable to protect the identity of routers transmitting a LSU message by requiring that they sign that message, for example, by means of a shared key cryptographic method.

The present invention results from the observation that such a method does not make it possible to prevent "internal" hijackings of information that may be implemented by a perpetrator controlling a transmission layer of a corrupt router such that the perpetrator can replace the LSU message received within the corrupt router with a LSU message comprising false lists, for example, identifying a fraudulent router in order to misdirect information to it.

In this situation, this corrupt LSU message is then correctly signed by the corrupt routers protection layer—even though that layer has not been hijacked by the perpetrator—and consequently, this fraud is extended to the network.

This means that, in the event of internal fraud, the perpetrator gets to have his or her false list considered valid by the OSPF area's other routers, which will observe the validity of the corrupt routers signature.

SUMMARY

The present invention aims to resolve this problem by proposing a method that makes it possible to ensure the integrity of topological maps established within a telecommunication network, particularly with respect to internal attacks enabling a perpetrator to control a router of that network in order to modify a list of links.

This invention therefore pertains to a method for protecting a telecommunication network comprising at least one secure router equipped with a topology map of that network in order to determine the intermediate routers that constitute an optimal pathway for routing information, said secure router and said intermediate routers generating this topological map by sharing the lists of links using a communications protocol, characterized in that the secure router performs the following steps:

The step of calculating and then saving, when receiving lists of links, at least one reception fingerprint of the received lists, The step of calculating and then saving, when sending lists of links, at least one transmission fingerprint of the list to be transmitted, the calculations determining the fingerprint of the list being carried out within a secure layer (Secure Area of Computation) distinct from a transmission layer carrying out the reception and/or transmission of packets in accordance with the communication protocol, and The step of comparing the reception fingerprint the transmission fingerprint, such that the transmission of at least one list is inhibited if the reception fingerprint is distinct from the transmission fingerprint.

Owing to the invention, it is possible to make a telecommunication network secure by preventing internal fraud aimed at controlling a router in order to modify its list of links and propagate a fraudulent list.

As a result, a secure router in accordance with the invention only shares with the other routers list of links whose fingerprint, during transmission, corresponds to the fingerprint during reception.

In other words, a secure router in accordance with the invention can verify the integrity of the shared lists in order to inhibit any sharing of a list that could have been modified internally, particularly within a separate transmission layer that is more vulnerable than a protection/encryption layer.

The invention exhibits the advantage of being able to be implemented in existing routers, in accordance with existing communication protocols, without requiring a change in all of the routers of the network in question.

In one embodiment, the method comprises the step of calculating the reception fingerprint for each received list and the step of calculating the transmission fingerprint for each list to be transmitted.

According to one embodiment, the method comprises the step of inhibiting only the transmission of lists whose reception fingerprint is distinct from the transmission fingerprint.

In one embodiment, the reception and transmission fingerprints are obtained by a hash function.

In one embodiment, the method comprises the step, for the secure layer, of associating with the transmitted lists a signature identifying the secure router after comparing the transmission and reception fingerprints.

According to one embodiment, the method comprises the step, for the secure layer, of verifying within the received lists a router signature among the lists received before the calculation of the transmission fingerprints.

In one embodiment, the secure layer is implemented with means that are remote or removable from the router.

In this situation, the remote or removable means may be formed by a smart card and/or a router distinct from the secure router.

According to one embodiment, the remote or removable means perform at least one of the following operations: Providing a hash function, storing the fingerprints, or comparing the reception fingerprints with the transmission fingerprints.

In one embodiment, the telecommunication network being an Internet area, the method uses the OSPF protocol to establish the map of that area by means of LSA lists.

The invention also pertains to a secure router of a telecommunication network comprising a topological map of that network for determining intermediary routers defining an optimal path for a piece of information within the routing, this secure router and these intermediary routers generating that topological map by sharing lists of links according to a communication protocol, characterized in that the secure router comprises means for implementing a method according to one of the preceding embodiments:

Means for calculating and saving, subsequent to receiving lists of links, at least one reception fingerprint of the received lists, Means for calculating and saving, prior to transmitting lists of links, at least one transmission fingerprint of the lists to be transmitted, Means for comparing the reception fingerprint the transmission fingerprint, such that the calculations determining the fingerprint of the lists are performed within a secure layer distinct from a transmission layer performing the reception and/or transmission of packets in accordance with the communication protocol, and Means for inhibiting the transmission of at least one list if the reception fingerprint is distinct from the transmission fingerprint.

The invention also pertains to a smart card for a secure router of a telecommunication network, this router being equipped with a topological map of that network in order to determine intermediate routers defining an optimal path for a piece of information within the routing, that topological map being generated by that secure router and those intermediary routers by sharing lists of links according to a communication protocol, characterized in that it comprises at least one of the following means for interacting with the secure server and implementing a method according to one of the preceding embodiments:

Means for calculating and/or saving, subsequent to the reception of lists of links by the secure server, at least one reception fingerprint of the received lists, Means for calculating and/or saving, prior to the transmission of lists of links, at least one transmission fingerprint of the lists to be transmitted, such that the calculations determining the fingerprint of the lists are performed within a secure layer distinct from a transmission layer performing the reception and/or transmission of packets in accordance with the communication protocol, Means for comparing the reception fingerprint to the transmission fingerprint, and/or Means for inhibiting the transmission of a list if the reception fingerprint is distinct from the transmission fingerprint.

DESCRIPTION OF THE DRAWINGS

The invention shall be better understood upon reading the description below, which is given only as a nonlimiting example, with reference to the attached drawings in which.

DETAILED DESCRIPTION

Figure 1:
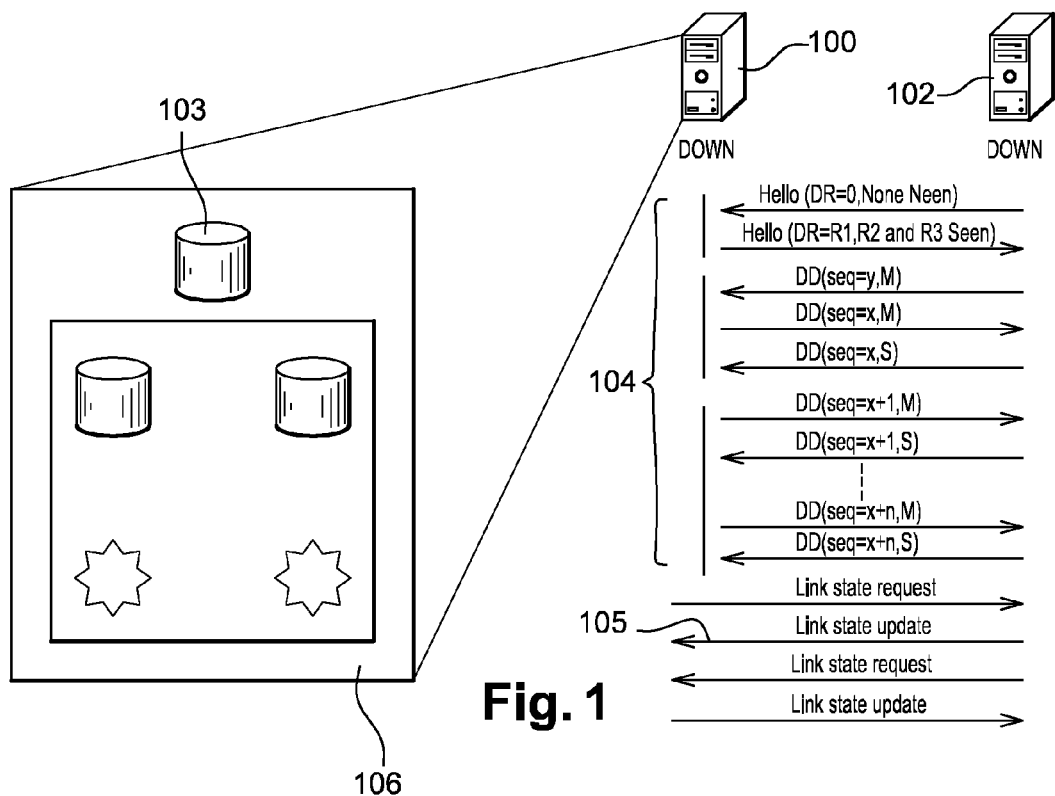
FIGS. 1 to 3 represent different steps of a method for receiving information related to a topological map of a telecommunication network according to the invention.

With reference to FIG. 1, two routers 100 and 102 are depicted, located on the same area of the Internet, which is not depicted.

In order to enable the updating of the LSDB database 103 of the router 100, the router 102 implements a first recognition exchange 104 enabling the sending 105 of an OSPF packet 106, or LSU for Link States Update, signed beforehand within its security layer.

Figure 2:
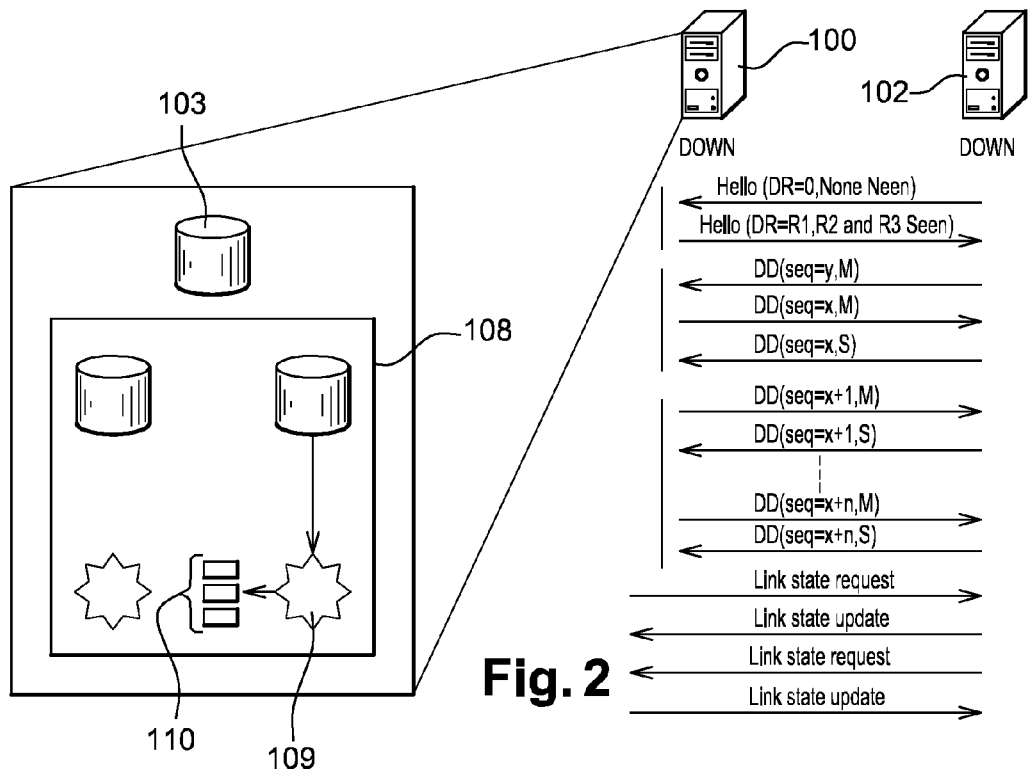

With reference to FIG. 2, the router 100 uses its security layer 108 to approve a signing of the router 102 (step 109) then, if approved, to extract the different lists LSA1, LSA2, . . . LSAn transmitted by that packet 106 (step 110).

Figure 3:
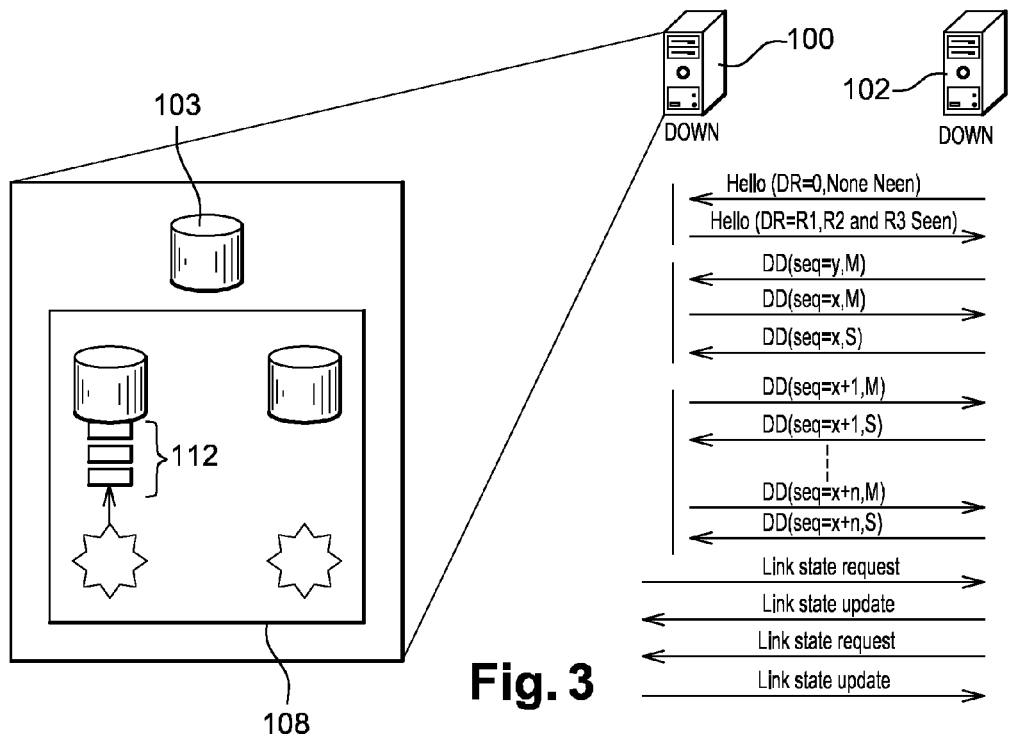

Afterward, at least one fingerprint 112 of these lists LSA1, LSA2 . . . LSAn is obtained and then stored within the protection layer (FIG. 3) such that any change to these lists within the transmission layer is detected by the protection layer.

Depending on the embodiments, it is possible to obtain a single fingerprint for all of the lists of links LSA1, LSA2 . . . LSAn transmitted, or multiple fingerprints hash(LSA1), hash(LSA2), . . . hash(LSAn) for each of these lists of links LSA1, LSA2, LSAn.

Under all circumstances, the invention is implemented by comparing fingerprints related to at least one list, these fingerprints being calculated in the same way taking into account that list—individually or with other lists.

Figure 4:
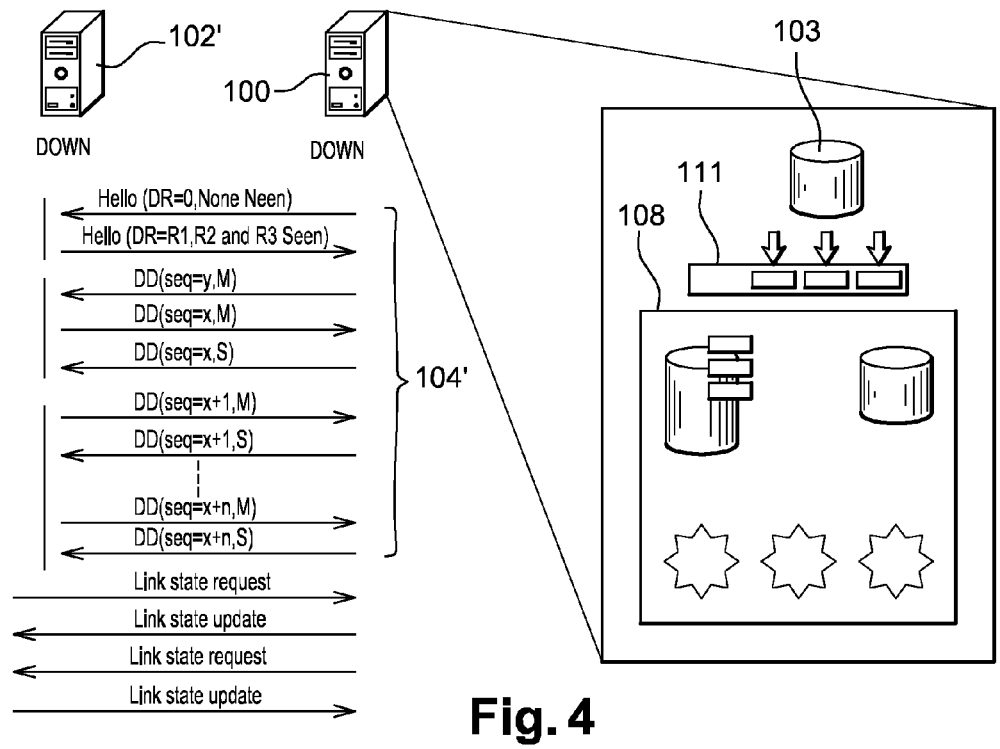
FIGS. 4 to 6 represent different steps of a method for transmitting information related to a topological map of a telecommunication network according to the invention.

Whenever the router 100 wishes to transmit lists LSA'1, LSA'2, . . . LSA'n to a router 102' within a LSU packet 111 after establishing 104 a communication, its database 103—located within its transmission layer—transmits the stored lists to its protection layer (FIG. 4) in order for that layer to generate the LSU packet 111 that particularly comprises the signature of the router 100.

Figure 5:
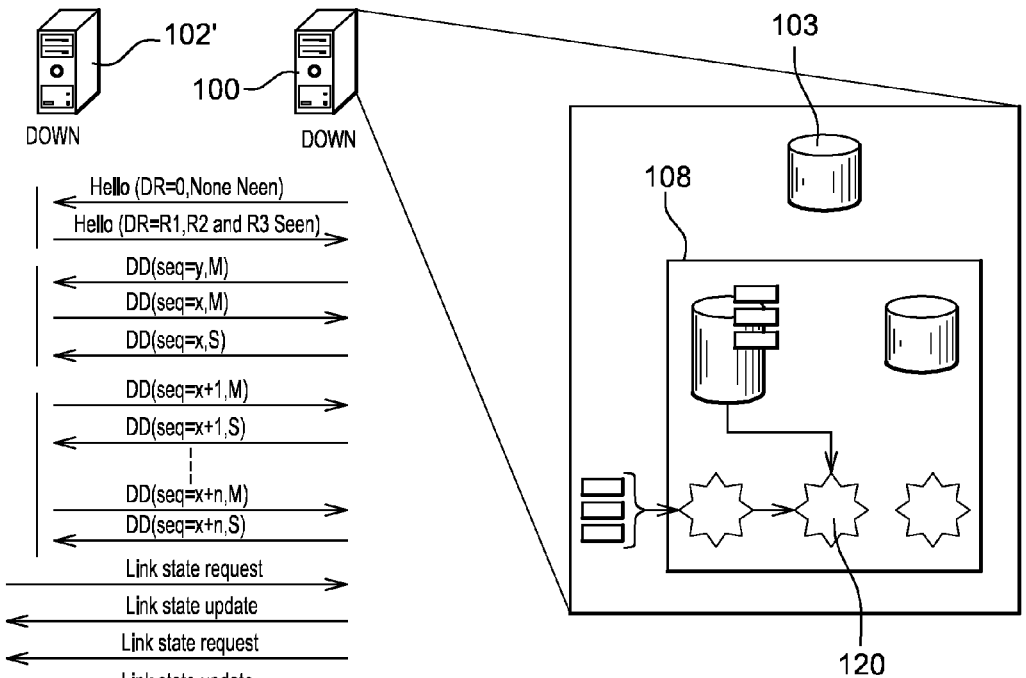

Prior to that signature, the protection layer carries out a verification of the lists LSA'1, LSA'2, . . . LSA'n transmitted by the database 103 by comparing—step 120—the fingerprints hash(LSA'1), hash(LSA'2), . . . hash(LSA'n) obtained from these lists LSA'1, LSA'2, . . . LSA'n with the fingerprints hash(LSA1), hash(LSA2), . . . hash(LSAn) already stored (FIG. 5).

Figure 6:
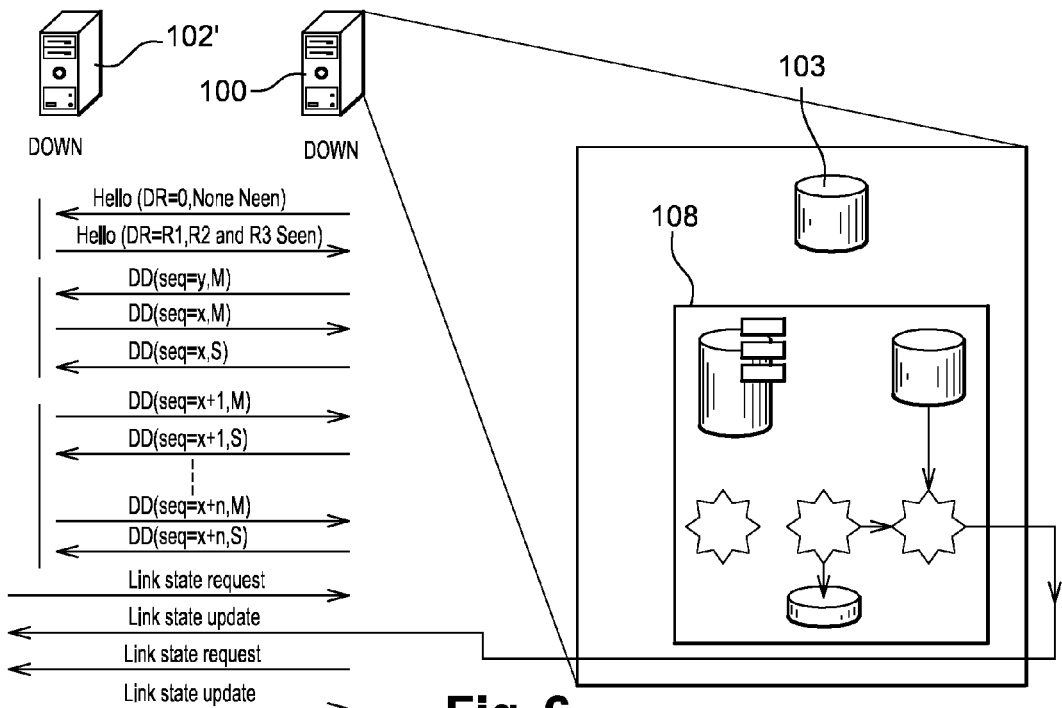

If these fingerprints are identical, then the lists are considered identical and the LSU packet is signed for its transmission (FIG. 6).

If need be, the router inhibits this transmission, believing that at least one of the lists has been corrupted.

The present invention is subject to many variants. In particular, the secure layer 103 may be implemented with means that are remote or removable from the router, such as a smart card and/or a router distinct from the secure router.

In this situation, these remote or removable means may perform at least one of the following operations: Providing a hash function, storing the fingerprints, or comparing the reception fingerprint with the transmission fingerprint.

The invention claimed is:

1. A method for protecting a network, comprising:
generating, by at least one secure router, a topology map of the network to determine intermediate routers which constitute an optimal pathway for routing information by sharing lists of links with the intermediary routers using a communications protocol, wherein the at least one secure router performs the steps of:
calculating and then saving in a secure layer, when a first list of links is received, at least one reception fingerprint of the lists received, wherein changes to the first list of the links within a transmission layer of the at least one secure router is detected by the secure layer;
calculating and then saving in the secure layer, when a second list of links is transmitted, at least one transmission fingerprint of the lists to be transmitted;
wherein the calculation that determines the fingerprint of the lists is performed in the secure layer distinct from the transmission layer that performs the reception and transmission of packets in accordance with the communication protocol; and
comparing the at least one reception fingerprint to the at least one transmission fingerprint in such a way that transmitting a list is inhibited when the at least one reception fingerprint is distinct from the at least one transmission fingerprint.

2. The method according to claim 1 further comprising the steps of:
calculating the at least one reception fingerprint for the received first list; and
calculating the at least one transmission fingerprint for the second list to be transmitted.

3. The method according to claim 2 further comprising the step of inhibiting only the transmission of lists whose reception fingerprint is distinct from the at least one transmission fingerprint.

4. The method according to claim 1 wherein the at least one reception fingerprint and the at least one transmission fingerprint are obtained by a hash function.

5. The method according to claim 1 further comprising the step, for the secure layer, of associating with the transmitted lists a signature identifying the secure router after comparing the at least one transmission fingerprint and the at least one reception fingerprint.

6. The method according to claim 5 further comprising the step, for the secure layer, of verifying a router signature within the received lists before calculating the at least one transmission fingerprint.

7. The method according to claim 5 wherein the secure layer is implemented with means that are remote or removable from the router.

8. The method according to claim 7 wherein the means that are remote or removable are formed by a smart card and a router distinct from the secure router.

9. The method according to claim 8 wherein the means that are remote or removable perform at least one of the following operations: providing a hash function, storing the fingerprints, or comparing the at least one reception fingerprint with the at least one transmission fingerprint.

10. The method according to claim 1, wherein the network is an area of the Internet that uses an Open Shortest Path First (OSPF) protocol to establish the topology map of that area by means of Link-State Advertisements (LSA) lists.

11. A secure router of a network, comprising:
a secure layer; and
a topological map of the network, wherein the topological map is used to determine intermediary routers that define an optimal path for routing information, the secure router being configured to generate the topological map by sharing lists of links with the intermediary routers according to a communication protocol, wherein the secure router is configured to
calculate and save in the secure layer, subsequent to reception of the lists of the links, at least one reception fingerprint of the received lists of the links, wherein changes to the lists of the links within a transmission layer of the secure router is detected by the secure layer;
calculate and save in the secure layer, prior to the transmission of the lists of the links, at least one transmission fingerprint of the lists of the links to be transmitted;
wherein the calculations that determine the fingerprint of the lists are performed in the secure layer distinct from the transmission layer that performs the reception and transmission of packets compliant with the communication protocol;
compare the at least one reception fingerprint to the at least one transmission fingerprint; and
inhibit the transmission of a list of links when the at least one reception fingerprint is distinct from the at least one transmission fingerprint.

12. A smart card for a secure router of a network,
wherein the smart card is configured to perform at least one of the following functions to interact with the secure router:
calculate and save in a secure layer, subsequent to reception of lists of links by the secure router, at least one reception fingerprint of the received lists of the links, wherein the secure router is configured to share the lists of the links with intermediary routers according to a communication protocol to generate a topological map of the network, and wherein changes to the lists of the links within a transmission layer of the secure router is detected by the secure layer;
calculate and save in the secure layer, prior to the transmission of the lists of the links, at least one transition fingerprint of the lists of the links to be transmitted;
wherein the calculations that determine the fingerprint of the lists are performed in the secure layer distinct from the transmission layer performing the reception and transmission of packets compliant with the communication protocol;
compare the at least one reception fingerprint to the at least one transmission fingerprint; and
inhibit the transmission of a list of links when the at least one reception fingerprint is distinct from the at least one transmission fingerprint.

13. The method according to claim 1 wherein the network that comprises the at least one secure router is a telecommunication network.

* * * * *